United States Patent
Gandhi et al.

(10) Patent No.: US 10,921,120 B2
(45) Date of Patent: Feb. 16, 2021

(54) BENDING AND KINKING DETECTION APPARATUS AND METHOD

(71) Applicant: Toyota Motor Engineering & Manufacturing North America, Inc., Plano, TX (US)

(72) Inventors: Umesh N. Gandhi, Farmington Hills, MI (US); Taewoo Nam, Ann Arbor, MI (US); Yuyang Song, Ann Arbor, MI (US); Ryohei Tsuruta, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 136 days.

(21) Appl. No.: 16/280,546

(22) Filed: Feb. 20, 2019

(65) Prior Publication Data
US 2020/0263980 A1 Aug. 20, 2020

(51) Int. Cl.
*G01B 11/26* (2006.01)
*G01C 5/04* (2006.01)
*G01N 29/024* (2006.01)

(52) U.S. Cl.
CPC .......... *G01B 11/26* (2013.01); *G01C 5/04* (2013.01); *G01N 29/024* (2013.01)

(58) Field of Classification Search
None
See application file for complete search history.

(56) References Cited

U.S. PATENT DOCUMENTS

| 5,955,881 A | 9/1999 | White et al. |
| 6,127,672 A * | 10/2000 | Danisch ................. G01B 11/18 250/227.14 |
| 6,211,668 B1 | 4/2001 | Duesler et al. |
| 6,256,090 B1 * | 7/2001 | Chen ..................... G01B 11/18 250/227.14 |
| 6,373,239 B1 | 4/2002 | Nekado |

(Continued)

OTHER PUBLICATIONS

Gioberto, G. et al., "Garment-Integrated Bend Sensor", Electronics, 3, pp. 564-581 (2014).

(Continued)

*Primary Examiner* — Natalie Huls
*Assistant Examiner* — Jermaine L Jenkins
(74) *Attorney, Agent, or Firm* — Christopher G. Darrow; Darrow Mustafa PC

(57) ABSTRACT

Systems, methods, and other implementations described herein relate to a manner of detecting kinking or other bending on a bendable structure. In one implementation, a bendable structure is configured to kink at different locations. First and second sensors surface-mounted antiparallel along the bendable structure have bending responses that increase with increasing amounts of bending, and that are increasingly sensitive along their lengths. The bending responses from first and second sensors are received at a first time and a second time subsequent to the first time. The formation of a kink is identified in response to identifying that the bending responses are indicative of unkinked bending at the first time and indicative of kinked bending at the second time. In response to identifying the formation of the kink, the location of the kink is identified based on the bending responses at the first time.

20 Claims, 6 Drawing Sheets

(56) References Cited

U.S. PATENT DOCUMENTS

| | | | |
|---|---|---|---|
| 7,446,884 B2* | 11/2008 | Massen | A43D 1/06 |
| | | | 250/334 |
| 9,322,121 B2 | 4/2016 | Dunne et al. | |
| 10,458,782 B2* | 10/2019 | Lee | G06F 1/1652 |
| 10,551,173 B2* | 2/2020 | Froggatt | G01M 11/31 |
| 2018/0107306 A1 | 4/2018 | Hong et al. | |
| 2019/0234727 A1* | 8/2019 | Roye | G01B 11/161 |

OTHER PUBLICATIONS

"What Do Wearable Stretch Sensors Have to Do With NASA Space Modules", StretchSense, http://www.stretchsense.com/article-resources/blog/what-do-wearable-stretch-sensors-have-to-do-with-nasa-space-modules/ (Mar. 16, 2017) (last downloaded Feb. 20, 2019).

"Electroactive Polymer Technology Monitors Movement and Stretch —EAP Sensor Evaluation Kits", Parker Hannifin Corporation, Quick Coupling Division, http://www.ph.parker.com/us/en/electroactive-polymer-technology-monitors-movement-and-stretch-eap-sensor-evaluation-kits (last downloaded Feb. 20, 2019).

"Images Scientific 2" Flexible Stretch Sensor, RobotShop, https://www.robotshop.com/en/images-scientific-2inch-stretch-sensor.html?gclid=EAIaIQobChMIv8Wx0Kfe2wIVil9-Ch3jzgAvEAQYAiABEgJPOfD_BwE (last downloaded Feb. 20, 2019).

Plusea, "How to make a super simple bend sensor in almost absolute silence", https:/youtube.com/watch?=CkPekPiA-sc, 2 screenshots (Apr. 23, 2009) (last downloaded Feb. 20, 2019).

Dunne, L., "Stitched Stretch Sensor", University of Minnesota, Office for Technology Commercialization, http://license.umn.edu/technologies/20130122_stitched-stretch-sensor (last downloaded Feb. 20, 2019).

\* cited by examiner

BENDING AND KINKING DETECTION APPARATUS AND METHOD

TECHNICAL FIELD

The embodiments disclosed herein relate to sensors and, more particularly, to their use for detecting bending in bendable structures.

BACKGROUND

So-called bending sensors, flexure sensors and like sensors with bending responses offer low-cost sensing solutions for detecting bending in bendable structures. The sensors can be easily interfaced to standard measurement circuitry, and their bending responses are well-behaved with respect to applied bending.

SUMMARY

Bendable structures, for example, inflatable tubes, tend to kink or otherwise bend at certain moment loads. In cases where the bendable structures might bend at different locations, there is a need to understand not only when bends form, but also the location of the bends along the bendable structures.

Systems, methods, and other implementations described herein relate to a manner of detecting kinking or other bending on a bendable structure. In one aspect, a detection system includes first and second sensors surface-mounted antiparallel along a bendable structure, and a control module communicatively connected with the first and second sensors. The bendable structure is configured to kink at different locations. The first and second sensors have bending responses that increase with increasing amounts of bending, and that are increasingly sensitive along their lengths. The control module is configured to receive the bending responses at a first time and a second time subsequent to the first time. Moreover, in response to identifying that the bending responses are indicative of unkinked bending at the first time and indicative of kinked bending at the second time, the control module is configured to identify the formation of a kink in the bendable structure. Moreover, in response to identifying the formation of the kink, the control module is configured to identify the location of the kink based on the bending responses at the first time.

In another aspect, a method includes receiving, at a first time and a second time subsequent to the first time, bending responses from first and second sensors surface-mounted antiparallel along a bendable structure. In relation to the method, the bendable structure is configured to kink at different locations. Moreover, the first and second sensors have bending responses that increase with increasing amounts of bending, and that are increasingly sensitive along their lengths. In response to identifying that the bending responses are indicative of unkinked bending at the first time and indicative of kinked bending at the second time, the method includes identifying the formation of a kink. Moreover, in response to identifying the formation of the kink, the method includes identifying the location of the kink based on the bending responses at the first time.

In yet another aspect, a detection system includes first and second sensors surface-mounted antiparallel along a bendable structure, and a control module communicatively connected with the first and second sensors. The bendable structure is configured to bend at different locations and, at each location, have different amounts of bending. The first and second sensors have bending responses that increase with increasing amounts of bending, and that are increasingly sensitive along their lengths. The control module is configured to receive the bending responses. Moreover, the control module is configured to identify the formation of a bend based on the bending responses. Moreover, in response to identifying the formation of the bend, the control module is configured to identify the location of the bend based on a lengthwise overlap of the first and second sensors, and a sum of the bending responses.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

Systems, methods and other embodiments associated with detecting bending, including kinking, on a bendable structure are disclosed. For instance, a kink associated with a bendable structure may be formed when a surface of the bendable structure transitions from having a continuous curvature to having a bending segment represented as a surface discontinuity. If the bendable structure becomes kinked, it may be desirable to know the location of the kink along the bendable structure. For example, if the bendable structure is an inflatable member of an aircraft wing, knowing when and where a kink is formed on the wing may allow an aircraft control system to, e.g., know how the wing is flexing, pursue a maneuver to alleviate the kink, wait until the kink is alleviated, etc.

The embodiments disclosed herein may apply to any suitable bendable structure. The embodiments are particularly useful for bending detection in bendable structures that might not only bend at different locations, but also, at each location, have different amounts of bending. In the embodiments, sensors with bending responses are surfaced mounted to the bendable structure. Although, individually, similar sensors might provide enough information for identifying when a bend begins to form, the sensors disclosed herein have specific relationships between alignment, geometry and bending responses to form a mechanism for providing enough information to identify not only when a bend, including a kink, begins to form, but also the location of the bend along the bendable structure.

Figure 1A:
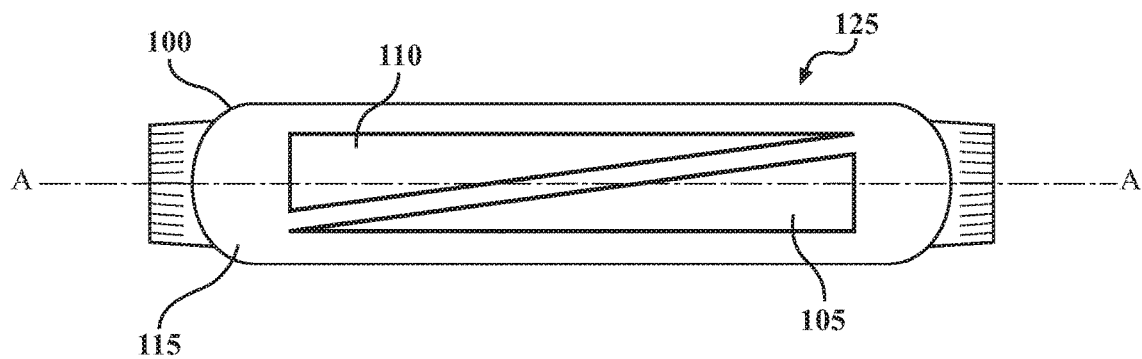
FIG. 1A is a top view of a representative bendable structure and first and second sensors surface-mounted to the bendable structure.

A representative bendable structure 100 having an axis A along which the bendable structure 100 is bendable is shown in a top view in FIG. 1A. In one implementation, the bendable structure 100 includes a first sensor 105 and a second sensor 110 that are both aligned along the axis A. The first and second sensors 105, 110 have bending responses. In relation to their bending responses, the first and second sensors 105, 110 have triangular geometries, and are surface-mounted antiparallel to each other. The significance of their alignment and triangular geometry for bending and kinking detection is described in detail below.

The bendable structure 100 may, for example, be an inflatable tube that includes an inflatable cavity 115 whose ends are sealed at the ends of the bendable structure 100, as shown in FIG. 1A. As another example, the bendable structure 100 may be a hollow bendable structure whose ends are not sealed, e.g., an open-ended rubber tube, an open-ended plastic sleeve, etc. As yet another example, the bendable structure 100 may be a solid piece of bendable material, e.g., aluminum, copper, polyvinyl chloride, etc. The bendable structure 100 may be any suitable structure formed of a material capable of bending along the axis A, e.g., rubber, plastic, metal, etc. The bendable structure 100 may be any suitable shape, e.g., a cylinder, a structure having an elongated oval cross-section, etc.

Figure 1B:
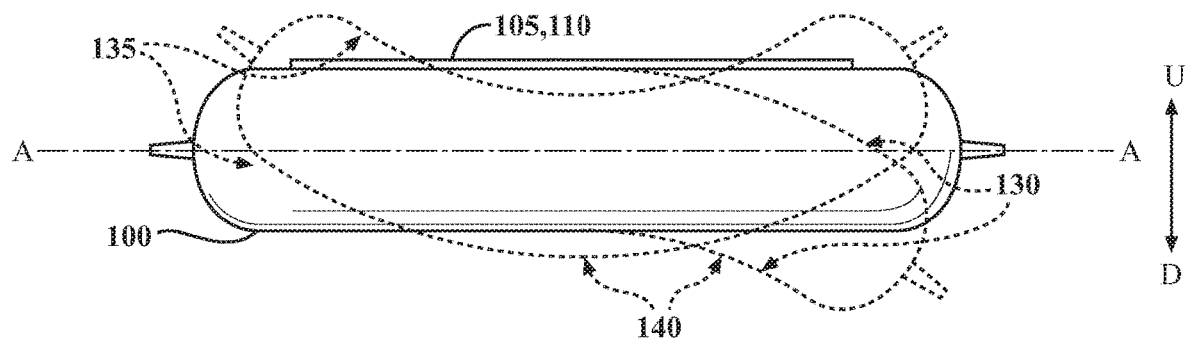
FIG. 1B is a side view of the bendable structure, showing the bendable structure in a non-bending state and representative bending states.

With reference to FIG. 1B, the bendable structure 100 is shown in a side view. The bendable structure 100 is shown in a non-bending state (rendered with solid lines) and representative bending states (rendered with hidden lines). One or both ends may bend either in a "down" D direction or in an "up" U direction. Although the bendable structure 100 may simultaneously bend in more than one direction, the segment of the bendable structure 100 that includes the first and second sensors 105, 110 may be limited to one bending direction to capture a simple, true amount of bending in the bendable structure 100 instead of a complex curvature. Alternatively, the system and method described herein may be applied to other bending directions besides the D and U directions, but for simplicity reasons, only the D and U directions will be discussed.

Figure 1C:
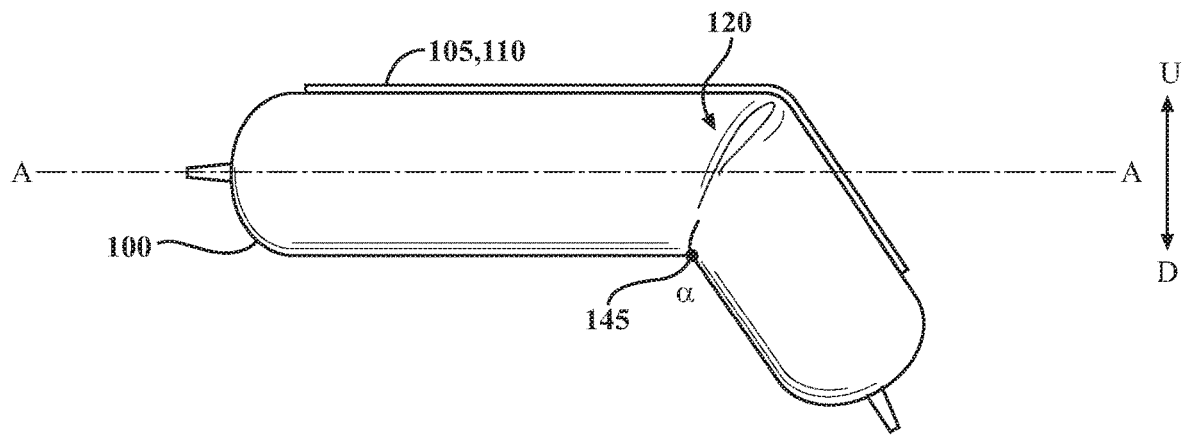
FIG. 1C is a side view of the bendable structure, showing a kink associated with the bendable structure.

As shown in FIG. 1C for an advanced bending state, the bendable structure 100 may develop a kink 120 along the axis A, as represented by a kink angle α. For example, if the inflatable tube of FIG. 1B continues to bend as the ends are brought closer together, it will eventually approach the kink angle α and develop the kink 120 illustrated in FIG. 1C. Specifically, the kink 120 associated with the bendable structure 100 is formed when a surface of the bendable structure 100 transitions from a continuous curvature, e.g., as illustrated in FIG. 1B, to a surface having a distinct discontinuity where there is no longer a single radius of curvature, e.g., as shown in FIG. 1C. The location of the kink 120 along the bendable structure 100 may be dependent upon the material and/or the geometry of the bendable structure 100.

The bendable structure 100 may be formed of an elastic material, i.e. the bendable structure 100 will return to its initial shape and size after returning from the bending state to the non-bending state. When formed of an elastic material, the bendable structure 100 may return to its initial shape and size after returning from the bending state that included the kink 120. The elastic material may be, for example, natural rubber, synthetic rubber, polyester-rubber mixture, etc.

Alternatively, the bendable structure 100 may be formed of a non-elastic material, i.e., the bendable structure 100 resists elastic deformation. For example, if the kink 120 occurred with the non-elastic material, the bendable structure 100 may not return to its original shape and size when transitioning back to the non-bending state. The non-elastic material may be, for example, metal, hard plastics, etc.

Referring to FIG. 1A, the bendable structure 100 may include a bendable region 125. For instance, the bendable region 125 may be a surface on an exterior of the bendable structure 100. The bendable region 125 may be a surface on an interior of the bendable structure 100, for example, a surface of the structure within the inflatable cavity 115 of the inflatable tube. As another example, the bendable region 125 may be a surface on the interior of a hollow bendable tube. The bendable region 125 may be any suitable surface area on the bendable structure 100 anticipated to reasonably bend. With reference to FIG. 1A, for example, a suitable surface area expected to reasonably bend may be the cylindrical surface area on the interior and exterior of the inflatable tube, not including the ends where the seal occurs. In the bendable region 125, the bendable structure 100 may be configured to bend, including kink, at different locations, including at every location, along the bendable structure 100. Moreover, at each of the different locations, including at every location, the bendable structure 100 may be configured to have different amounts of bending.

The first and second sensors 105, 110 may be continuously formed on an included substrate. For instance, the substrate may be a transparent resin having flexibility. As noted above, the first and second sensors 105, 110 have bending responses. The first and second sensors 105, 110 may include any suitable material for returning output in response to bending, for example, electroconductive ink or paint (e.g., including carbon particles), polyvinylidene fluoride (PVDF), etc. The first and second sensors 105, 110 may be surface-mounted to the bendable structure 100 by various techniques, such as bonding, adhering, welding, etc. Alternatively, the first and second sensors 105, 110 may be discontinuously formed on the substrate. As yet another alternative, the first and second sensors 105, 110 may have shapes other than the triangular shape of FIG. 1A and include a plurality of different materials.

The first and second sensors 105, 110 may be unidirectional. Specifically, the material of the first and second sensors 105, 110 may have a bending response that is predictable, e.g., linear, only when placed on a surface that bends in a convex fashion along the axis A. For example, and referring to FIG. 1B, if the intended bending direction of the bendable structure 100 along the axis A is in the D direction, then the first and second sensors 105, 110 may be surface-mounted to convex down surfaces 130. In keeping with the illustrated example, if the intended bending direction of the bendable structure 100 is in the U direction, then the first and second sensors 105, 110 may be surface-mounted to convex up surfaces 135. In some instances, the first and second sensors 105, 110 may be bidirectional. That is, the bending response may be predictable, e.g., linear, when the first and second sensors 105, 110 are bent in either the D or U directions.

Figure 2A:
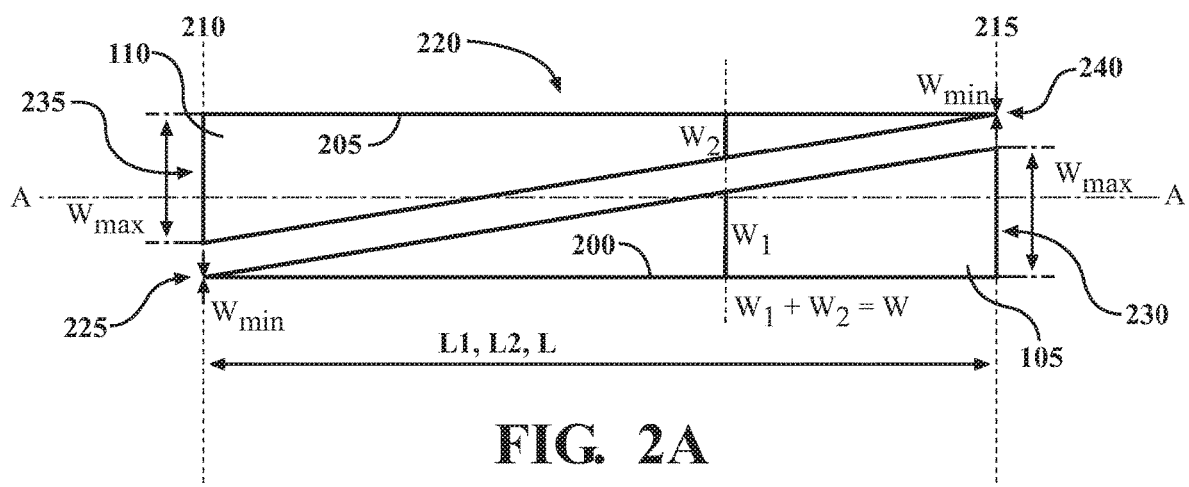
FIG. 2A is a top view of the first and second sensors, showing aspects of the first and second sensors being arranged antiparallel to each other.

The first and second sensors 105, 110, as set forth above, are arranged symmetrically about the axis A, have the same or otherwise similar triangular geometries, and are antiparallel to each other, as shown in FIG. 2A. The first sensor 105 includes a length 200 having a magnitude L1, and the second sensor includes a length 205 having a magnitude L2. The first and second sensors 105, 110 overlap, as set forth below, along an overlap length L. As will become clear with further discussion below, the sensor arrangement in FIG. 2A may be used to provide the ability to identify the location of the kink 120 along the bendable structure 100.

For the first and second sensors 105, 110 to be antiparallel, they are arranged such that at least two geometric conditions are satisfied. First, the lengths 200, 205 are both parallel to the axis A, as shown in FIG. 2A. Second, at least two planes 210, 215 spaced from each other, and perpendicular to the axis A, intersect the first and second sensors 105, 110. For example, as illustrated in FIG. 2A, the two planes 210, 215 are spaced from each other, and perpendicular to the axis A, and each plane 210, 215 intersects both the first and second sensors 105, 110. The maximum possible region between the planes 210, 215 that intersects the first and second sensors 105, 110 is defined as an overlap region 220 having the overlap length L, as shown in FIG. 2A.

As set forth herein, the location of the kink 120 along the bendable structure 100 is identifiable inside the overlap region 220. Contrariwise, it is contemplated that the location of the kink 120 along the bendable structure 100 may not be identifiable outside the overlap region 220. Accordingly, as shown in FIG. 2A, the magnitudes L1 and L2 are the same as the overlap length L. However, it will be understood that the first and second sensors 105, 110 may be slightly offset from one another, in which case the overlap length L is not the same as the magnitudes L1 and L2, i.e., the overlap length L is less than the magnitudes L1 and L2, and still be antiparallel. Moreover, it is possible to have the first and second sensors 105, 110 be of different magnitudes L1 and L2. In this case, the first and second sensors 105, 110 are still antiparallel as long as the two geometric conditions for being antiparallel are satisfied and the first and second sensors 105, 110 have equivalent widths in the overlap region 220.

The first and second sensors 105, 110 may be arranged in other configurations from the side-by-side arrangement illustrated in FIG. 2A and still satisfy the two geometric conditions for being antiparallel. For example, the first and second sensors 105, 110 may be mounted on top of each other. As another example, the bendable structure 100 may have a substantial width and the first and second sensors 105, 110 may be separated by large distances, e.g., one meter, two meters, etc.

With reference to FIG. 2A, the first sensor 105 includes a first end 225 and a second end 230, and the second sensor 110 includes a first end 235 and a second end 240. The first and second sensors 105, 110 further include electrodes located at the respective first ends 225, 235 and the respective second ends 230, 240. The electrodes are electrically coupled to the material of the first and second sensors 105, 110. As set forth below, the electrodes may be coupled to measuring equipment so that the bending responses of the first and second sensors 105, 110 may be determined.

Figure 2B:
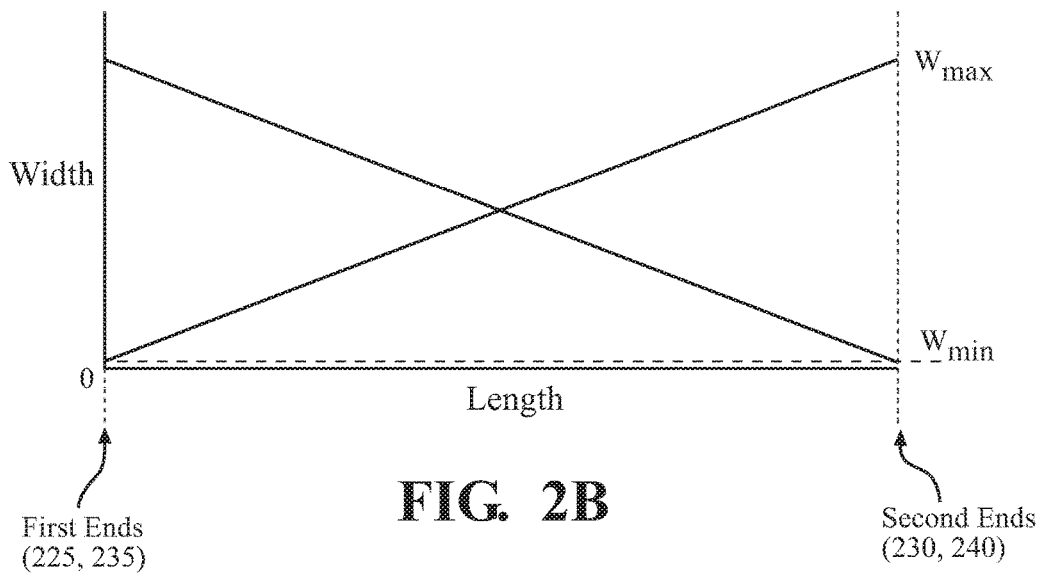
FIG. 2B is a graph representing a relationship in which the first and second sensors have widths that change along their lengths.

With reference to FIGS. 2A and 2B, the first sensor 105 includes a width W1 that increases linearly from a minimum width Wmin, which may be a small finite width, to a maximum width Wmax along the length 200 from the first end 225 to the second end 230. The second sensor 110 includes a width W2 that decreases linearly from a maximum width Wmax to a minimum width Wmin, which may be a small finite width, along the length 205 from the first end 235 to the second end 240. As illustrated in FIG. 2A, the magnitudes L1, L2 and the overlap length L are the same. However, as set forth above, this may not be the case.

Accordingly, with the antiparallel arrangement and the linearity of the change in the widths W1, W2 of the first and second sensors 105, 110, the sum of the widths W1, W2 taken along the bendable structure 100, i.e., the lengths 200, 205, is conserved. Specifically, the sum of the widths W1, W2 taken at any location along the lengths 200, 205 in the overlap region 220 is constant, as shown in FIG. 2A for an arbitrary location along the lengths 200, 205.

Figure 2C:
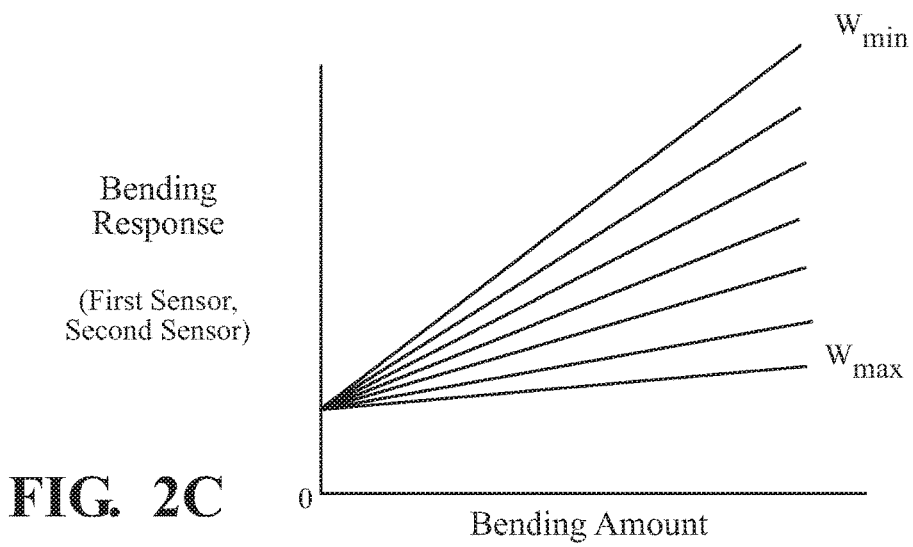
FIG. 2C is a graph representing a relationship in which the first and second sensors, in relation to their changing widths, have bending responses that increase with increasing amounts of bending, and that are increasingly sensitive along their lengths.

Furthermore, as the widths W1, W2 change from the maximum widths Wmax to the minimum widths Wmin along the lengths 200, 205, the bending responses of the first and second sensors 105, 110 are increasingly sensitive along their lengths 200, 205. This is best illustrated in FIG. 2C. For a localized curvature 140 (FIG. 1B) that approaches the formation of the kink 120 along the lengths 200, 205, the bending response of the first or second sensor 105, 110 is shown for various widths W1, W2 of the first and second sensors 105, 110 in FIG. 2C. For example, increasing amounts of bending along the bendable structure 100 near the minimum width Wmin of the first sensor 105 would yield more sensitive bending responses than the same amounts of bending near the maximum width Wmax as illustrated by the greater slope of the bending response. Therefore, for a given amount of bending, the first and second sensors 105, 110 have increasingly sensitive bending responses along their lengths 200, 205 from the maximum widths Wmax to the minimum widths Wmin.

Another property resulting from the summation of the widths W1, W2 of the first and second sensors 105, 110 being constant along the lengths 200, 205, is that the sum of the bending responses from the first and second sensors 105, 110 equates to the amount of bending of the bendable structure 100.

For unkinked bending, the first and second sensors 105, 110 produce a bending response proportional to the bending of the bendable structure 100, i.e., the localized curvature 140 of the bendable structure 100. For kinked bending, when the bendable structure 100 is flexed to the point of the kink 120, the localized curvature 140 transitions to a physical bending angle, i.e., two lines intersecting at a vertex 145 forming the kink angle α, as shown in FIG. 1C. Therefore, the amounts of bending illustrated in FIG. 2C are more of a localized curvature response up until the formation of the kink 120. For example, a reference frame and/or a calibration may be used to translate the localized curvature response into a bending angle. A reference frame, e.g., an X-Y coordinate frame, may be used and the bendable structure 100 may be incrementally flexed within the X-Y coordinate frame while the bending response is measured. This may provide a calibration that maps the bending of the first and second sensors 105, 110 to the X-Y coordinate frame, wherein an associated bending angle may be derived.

Once the kink 120 occurs, the bending responses may become kinked bending responses, as discussed below.

In one arrangement, the first and second sensors 105, 110 may have a bending response that increases with increasing amounts of bending, as shown in FIG. 2C. For instance, the bending response may be an electrical resistance, pressure, etc., that changes as the amount of bending of the bendable structure 100 changes. The bending response may be non-zero for the first and second sensors 105, 110 that are not bent, i.e., when the first and second sensors 105, 110 are at zero degrees (e.g., not bent, lying flat, etc.). With reference to FIG. 2C, for example, the bending response of the first and second sensors 105, 110 has a non-zero electrical resistance when the first and second sensors 105, 110 are not bent, e.g., 10,000 Ohms, 20,000 Ohms, etc., and increases linearly with increasing amounts of bending. As another example, the first and second sensors 105, 110 may have a bending response that decreases with increasing amounts of bending, and may have a zero bending response when the first and second sensors 105, 110 are not bent, i.e., in the non-bending state.

Figure 3:
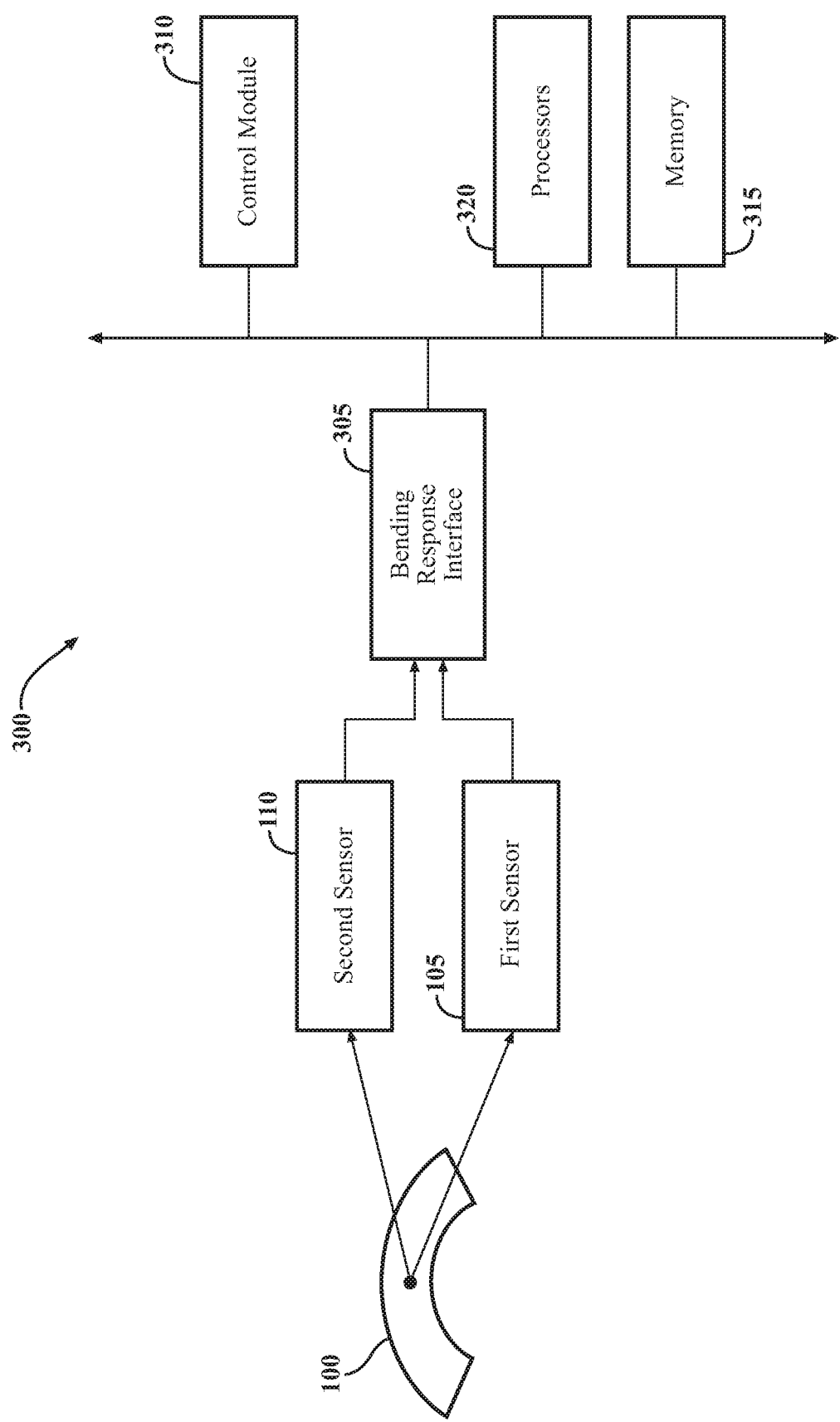
FIG. 3 is a block diagram of one implementation of a detection system for detecting bending, including kinking, in the bendable structure.

With reference to FIG. 3, in one implementation, a detection system 300 for detecting bending, including kinking, i.e., when the kink 120 begins to form, and the location of the kink 120 along the bendable structure 100 is illustrated. The detection system 300 includes the first and second sensors 105, 110 surface-mounted to the bendable structure 100, as set forth above. The detection system 300 also includes a bending response interface 305 and a control module 310, as set forth further below. The control module 310 is communicatively connected with the first and second sensors 105, 110 to receive the bending responses via the bending response interface 305. The bending response interface 305 is in electrical communication with the first and second sensors 105, 110 and the control module 310. It should be appreciated that the detection system 300 may only detect one bend or one kink, as set forth above.

The bending response interface 305 may include input circuitry that conditions the bending responses for use by the control module 310. For example, the bending responses from the first and second sensors 105, 110 may be electrical resistance variations that change with amount of bending in the bendable structure 100, as illustrated in FIG. 2C. The bending response interface 305 may be electrical circuitry that transforms the bending responses into a suitable electrical range for use by the control module 310, e.g., a range of 0-5 volts. The bending response interface 305 may include analog to digital converters and the bending response interface 305 may output digital signals representing the bending responses to the control module 310. The control module 310 may include the bending response interface 305, and both may be components of an electrical instrumentation system.

The control module 310, in one or more arrangements, orchestrates the operation of the detection system 300 for bending and kinking detection, including identifying the location of the kink 120 along the bendable structure 100, based on the bending responses of the first and second sensors 105, 110. Accordingly, as a prerequisite to the identification, the control module 310, in one arrangement, receives bending response values from the bending response interface 305 at a predetermined sampling rate every, e.g., 250 milliseconds, 500 milliseconds, second, two seconds, etc. The control module 310 may store the predetermined sampling rate and the bending response values in a memory 315, as described below, every sampling time. The control module 310 may store a fixed number of values before overwriting older values. As described above, the control module 310 may determine the amount of bending from the summation of the bending responses and store the amount of bending in the memory 315 at every sampling time.

Referring once again to FIG. 3, in relation to the control module 310, the detection system 300 includes one or more processors 320 and memory 315 to which the control module 310 is communicatively connected. The processors 320, the memory 315 and the control module 310 together serve as a computing device whose control module 310 is employable to orchestrate the operation of the detection system 300.

The processors 320 are any components configured to execute any of the processes described herein or any form of instructions to carry out such processes or cause such processes to be performed. The processors 320 may be implemented with one or more general-purpose or special-purpose processors. Examples of suitable processors 320 include microprocessors, microcontrollers, digital signal processors or other forms of circuitry that execute software. Other examples of suitable processors 320 include without limitation central processing units (CPUs), array processors, vector processors, digital signal processors (DSPs), field programmable gate arrays (FPGAs), programmable logic arrays (PLAs), application specific integrated circuits (ASICs), programmable logic circuitry or controllers. The processors 320 may include at least one hardware circuit (e.g., an integrated circuit) configured to carry out instructions contained in program code. In arrangements where there are multiple processors 320, the processors 320 may work independently from each other or in combination with one another.

The memory 315 is a non-transitory computer readable medium. The memory 315 may include volatile or nonvolatile memory, or both. Examples of suitable memory 315 includes random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives or any other suitable storage medium, or any combination of these. The memory 315 includes stored instructions in program code. Such instructions are executable by the processors 320 or the control module 310. The memory 315 may be part of the processors 320 or the control module 310, or may be communicatively connected the processors 320 or the control module 310. The control module 310 may store data, e.g., bending response values, amount of bending, etc., in the memory 315.

Generally speaking, the control module 310 includes instructions that may be executed by the processors 320. The control module 310 may be implemented as computer readable program code that, when executed by the processors 320, execute one or more of the processes described herein. Such computer readable program code may be stored on the memory 315. The control module 310 may be part of the processors 320, or may be communicatively connected the processors 320.

Figure 4A:
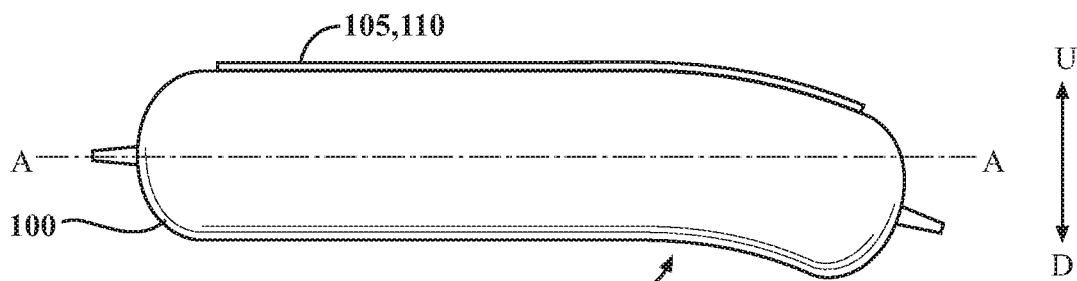
FIG. 4A is a side view of the bendable structure, showing the bendable structure in a bending state at a time T1.
Figure 4B:
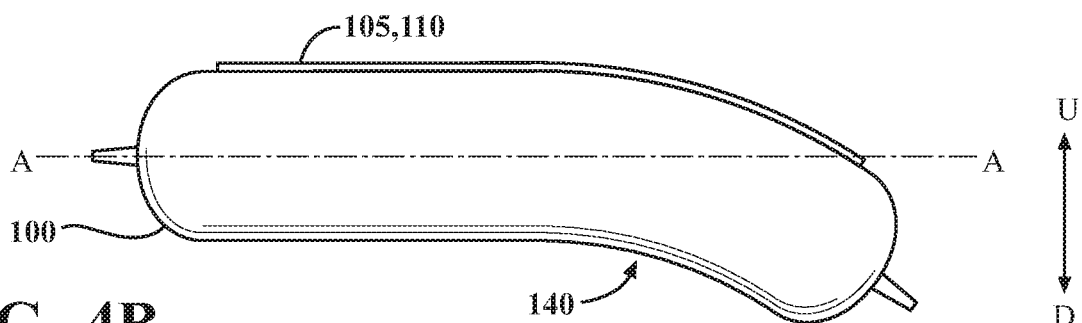
FIG. 4B is a side view of the bendable structure, the bendable structure in another bending state at a time T2.
Figure 4C:
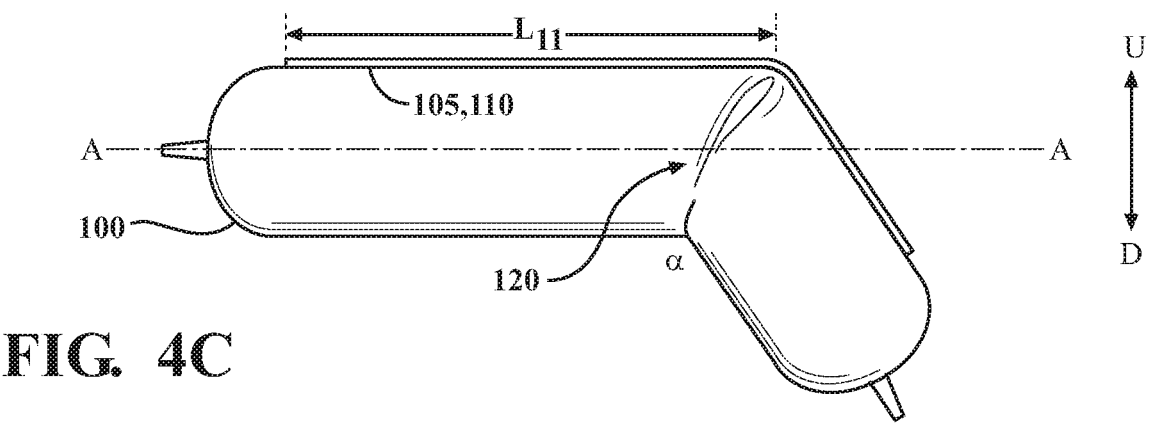
FIG. 4C is a side view of the bendable structure, showing the bendable structure including a kink at a time T3.
Figure 4D:
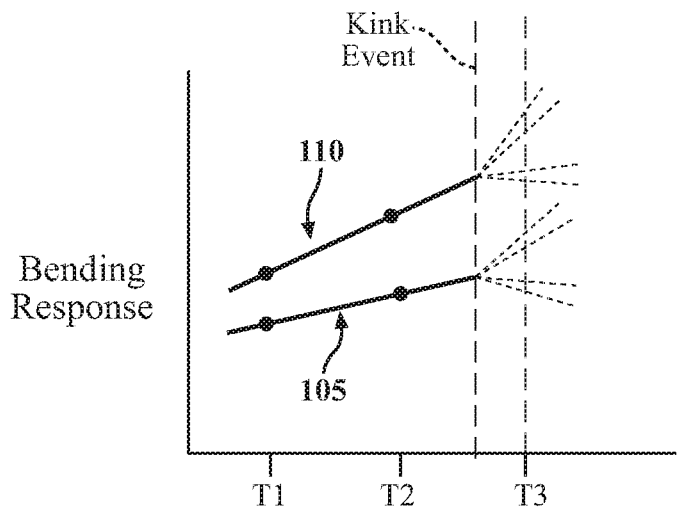
FIG. 4D is a graph of the bending responses at the times T1, T2 and T3.

The control module 310 may identify an unkinked bending response or, in other words, a bending response indicative of unkinked bending, from the bending responses of the first and second sensors 105, 110. For example, as shown in FIGS. 4A, 4B and 4D, the bendable structure 100 progressively bends at a given rate in the D direction from a mild amount of bending in FIG. 4A at a time T1 to an intermediate amount of bending in FIG. 4B at a time T2. Accordingly, the bending responses corresponding to the current sample time T2 are identified by the control module 310 as stable, unkinked bending responses, and moving forward, the time T2 is associated with a first time.

The control module 310 may identify a kinked bending response or, in other words, a bending response indicative of kinked bending, from the bending responses. As the bendable structure 100 continues to progressively bend at the given rate in the D direction, a kink event or, in other words, the formation of the kink 120, occurs at a time T3, as shown in FIGS. 4C and 4D. Once the kink event occurs, the bending responses are unpredictable. Accordingly, the bending responses corresponding to the current sample time T3 are identified by the control module 310 as unstable, kinked bending responses, and the time T3 is associated with a subsequent second time to the first time.

Unkinked bending responses and kinked bending responses identified by the control module 310 may be determined from experimentation. For example, a test sample containing the bendable structure 100 with known geometries and material that includes the first and second sensors 105, 110 of a known material and construction may be bent at, for example, specific amounts of bending, bending rates, etc. from a non-bending state to bending states and beyond until the bendable structure 100 starts kinking. The kinked bending response at the kink event may be characterized from the experimentation, for example, from noise occurring in the bending responses as the kinking occurs, high slope changes in the bending responses between the first time and the subsequent second time, from an inflection occurring, etc. Unkinked bending responses and kinked bending responses may be characterized for a given set of first and second sensors 105, 110 and a bendable structure 100 in any suitable manner by calibrating the set over representative amounts of bending, bending rates, temperatures, atmospheric pressures, etc. Moreover, an adequate sample rate to capture the kinked bending response at the subsequent second time may be determined from experimentation.

In response to identifying unkinked bending responses at the first time and at least one kinked bending response at the subsequent second time (e.g., from the first or second sensor 105, 110 at the time T2 and the time T3), the control module 310 may identify the kink event for the bendable structure 100. The kink event is defined to be a time when the bendable structure 100 transitions from the localized curvature 140 to the kink angle α, for example, as shown in FIGS. 4A-4D. The kink event may occur at any time immediately after the first time, for example, after the time T2 and up to and including the subsequent second time, for example, the time T3. Therefore, as the sample time increases, the accuracy of the identification of the time of the kink event increases. However, the location of the kink 120 and the kink angle α can only be reliably identified from the sum of bending responses at the first time because the bending responses become more unpredictable when the kink 120 actually occurs, as set forth above. Therefore, the time of the kink event is defined to occur at the first time to be consistent with reliable identification the location of the kink 120 and the kink angle α. Accordingly, the control module 310 determines the location of the kink 120 and the kink angle α from the sum of the bending responses at the first time, just prior to the formation of the kink 120.

With reference to FIG. 4D, the top curve corresponds to the bending response for the second sensor 110. The localized curvature 140 that eventually developed into the kink 120 occurred near the second end 240 of the second sensor 110, which tends to be more sensitive than the first sensor 105 at this kink location. Accordingly, because of the antiparallel arrangement and the triangular similarities, the slope of the bending response for the second sensor 110 is greater than the slope of the bending response for the first sensor 105. For instance, as the location of the localized curvature 140 moves toward a middle of the first and second sensors 105, 110, the slopes tend to converge. As the localized curvature 140 moves toward the first ends 225, 235, the slope of the bending response of the first sensor 105 tends to be greater than the slope of the bending response of the second sensor 110.

In response to identifying the kink event for the bendable structure 100, the location of the kink 120 along the bendable structure 100 is identified by the control module 310 based on the unkinked bending responses at the first time. Because of the antiparallel arrangement and the triangular similarities between the first and second sensors 105, 110, key relationships develop that allow the location of the kink 120 to be identified. For instance, the following relationships hold true when the kink event occurs and the unkinked bending responses at the first time are used. If the bending responses of the first and second sensors 105, 110 are, e.g., respective electrical resistances R1 and R2, the proportion of the resistance R1 due to the first sensor 105, as determined by the control module 310, to the total resistance R1+R2, is given by the relationship: R1/(R1+R2). Furthermore, the proportion of the width W1 of the first sensor 105 to the total width W, i.e., the sum of the widths W1, W2 at any location along the lengths of the first and second sensors 105, 110 is given by the relationship: W1/(W1+W2). Because of the key relationships between the first and second sensors 105, 110, as set forth above, the following relationship is true:

$$W1/(W1+W2)=R1/(R1+R2) \qquad \text{[Equation 1]}.$$

Also, the following relationship is true at the location of the kink 120 for the overlap length L, the widths W1, W2 and a length L11, which is the length from the first end 225 of the first sensor 105 to the location of the kink 120:

$$L11/L=W1/(W1+W2) \qquad \text{[Equation 2]}.$$

For Equation 2, the widths W1 and W2 are the widths of the first and second sensors 105, 110 at the location of the kink 120, respectively. Thus, plugging Equation 1 into Equation 2:

$$L11=[R1/(R1+R2)]*L \qquad \text{[Equation 3]}.$$

Equation 3 gives the location L11 of the kink 120 relative to the first end 225 of the first sensor 105 as a function of the known overlap length L and the measured bending responses at the first time. Therefore, the control module 310 may identify the location L11 of the kink 120 relative to the first end 225 of the first sensor 105 based on the unkinked bending responses at the first time and the known overlap length L. Additionally, if the length 200 is equal to the overlap length L, the control module 310 may identify the location L11 of the kink 120 relative to the first end 225 of the first sensor 105 based on the unkinked bending responses at the first time and the magnitude L1 of the length 200 of the first sensor 105. The Equations may be easily changed such that the location of the kink is identified relative to the second end 240 of the second sensor 110 based on the unkinked bending responses at the first time and the known overlap length L or the magnitude L2 of the length 205 of the second sensor 110.

In response to identifying the kink event, the control module 310, in one implementation, identifies that the kink 120 resulting from the kink event has been alleviated based on the amount of bending of the bendable structure 100. For example, the control module 310 may continue to receive bending responses after the kink event. In this case, the control module 310 may determine that the kink 120 has been alleviated when the amount of bending as calculated from the summation of the bending responses is lower than the kink angle α for a predetermined number of samples. The control module 310 may utilize any suitable method of determining that the kink 120 has been remedied or otherwise alleviated.

Figure 5:
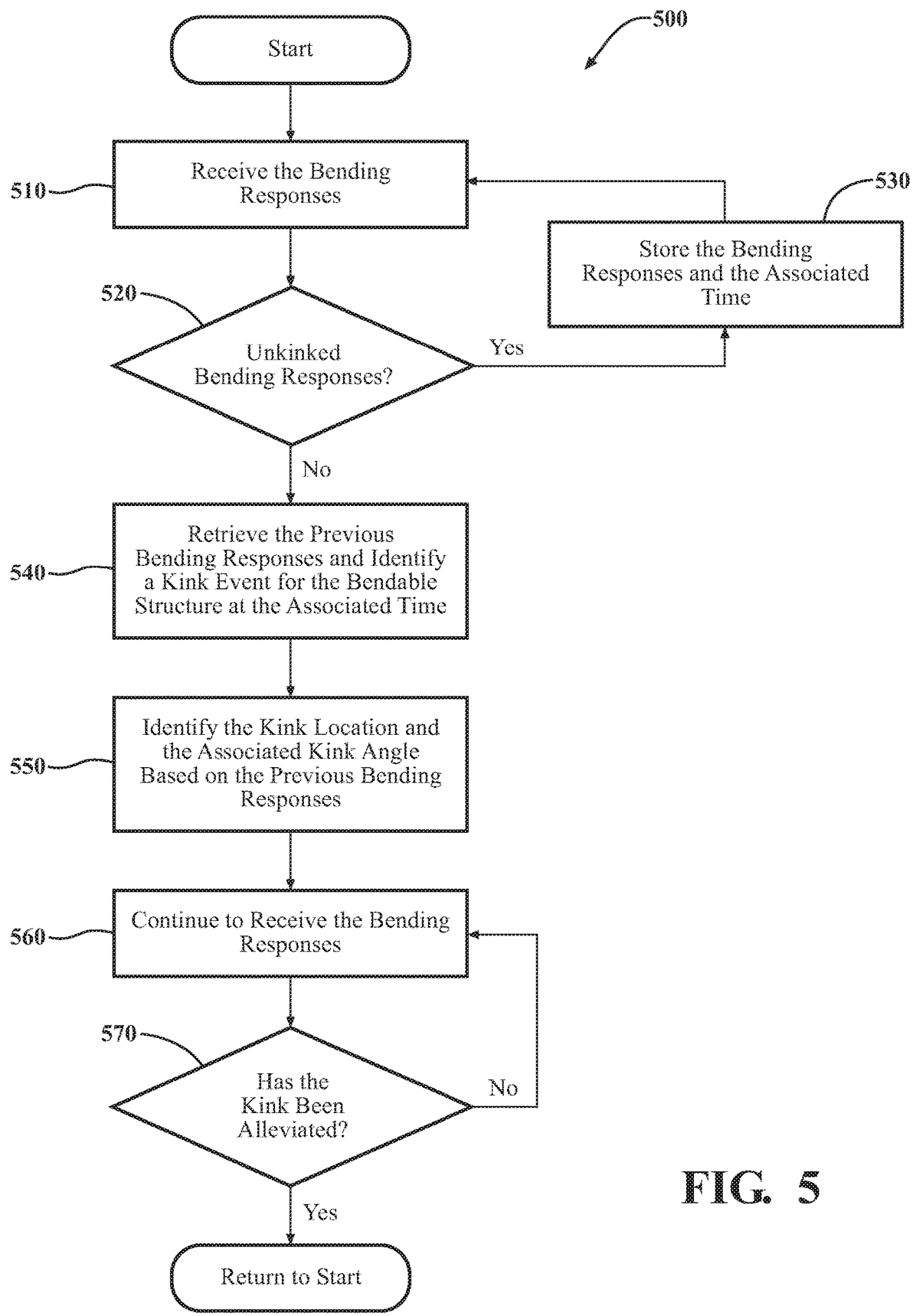
FIG. 5 is a flowchart illustrating one example of a method associated with detecting kinking in the bendable structure.

FIG. 5 illustrates a flowchart of method 500 associated with detecting kinking in the bendable structure 100. The method 500 will be discussed from the perspective of the detection system 300 of FIGS. 1-4. While the method 500 is discussed in combination with the detection system 300, it should be understood that the method 500 is not limited to being implemented within the detection system 300, but the detection system 300 is instead one example of a system that may implement the method 500. The steps that are illustrated herein as part of the method 500 are not limited to this particular chronological order. Indeed, some of the steps may be performed in a different order than what is shown and/or at least some of the steps shown can occur simultaneously.

At block 510, the control module 310 is communicatively connected with the first and second sensors 105, 110 to receive their bending responses via the bending response interface 305. The control module 310 may sample the bending responses at the predetermined sample rate. The sample rate may be sufficiently fast enough to capture kinked bending responses, e.g., 250 milliseconds, 500 milliseconds, one second, etc. After receiving one sample of the bending responses, the method 500 may proceed to block 520.

At block 520, the control module 310 may determine if the bending responses are unkinked bending responses. As set forth above, the control module 310 may determine if the bending responses are deviating from their bending responses when their bending responses are unkinked bending responses. If the control module 310 identifies the bending responses as unkinked bending responses, the method 500 may proceed to block 530. Otherwise, the bending responses are identified as kinked bending responses. In this case, the control module 310 may associate the current sample time to a subsequent second time (e.g., the time T3 to the time T2). The control module 310 may store a subsequent second time value in the memory 315, and the method 500 may proceed to block 540.

At block 530, the control module 310 may store unkinked bending response values in the memory 315. The control module 310 may associate the current sample time to a first time and may store a first time value in the memory 315 with the unkinked bending response values. After storing the data, the method 500 may proceed back to block 510 to receive subsequent bending responses.

At block 540, having identified a kinked bending response in block 520 at the subsequent second time, the control module 310 may identify the kink event. The kink event occurs at a time when the bendable structure 100 transitions from the localized curvature 140 to the kink angle α, for example, as shown in FIGS. 4A-4C. The control module 310 may retrieve the previous unkinked bending response values and the associated first time value from the memory 315. The control module 310 associates the first time to the kink event time, and the method 500 may proceed to block 550.

At block 550, the control module 310 may determine the location of the kink 120 and the associated kink angle α from the bending responses at the first time. Equation 3, as set forth above, may be used by the control module 310 to determine the location of the kink 120 given the overlap length L of the first and second sensors 105, 110. Equation 3 provides the location L11 of the kink 120 relative to the first end 225 of the first sensor 105, as shown in FIG. 4C. The associated kink angle α may be determined by the control module 310 from the sum of the bending responses at the first time. The control module 310 may store values representing the location L11 of the kink 120 relative to the first end 225 of the first sensor 105 and the associated kink angle α in the memory 315. The method 500 may proceed to block 560.

At block 560, the control module 310 may continue to receive bending responses from the first and second sensors 105, 110 at the predetermined sample rate. After receiving one sample of the bending responses, the method 500 may proceed to block 570.

At block 570, the control module 310, in response to identifying the kink event, identifies that the kink 120 resulting from the kink event has been alleviated based on the amount of bending. As set forth above, for example, the control module 310 may determine that the amount of bending, as determined from the summation of the bending responses, is lower than the kink angle α for a predetermined number of samples to determine that the kink 120 has been remedied or otherwise alleviated. Accordingly, if this condition fails, the method 500 may proceed back to block 560 to receive another bending response sample. Otherwise, the kink 120 may have been alleviated and the method 500 may terminate.

Figure 6:
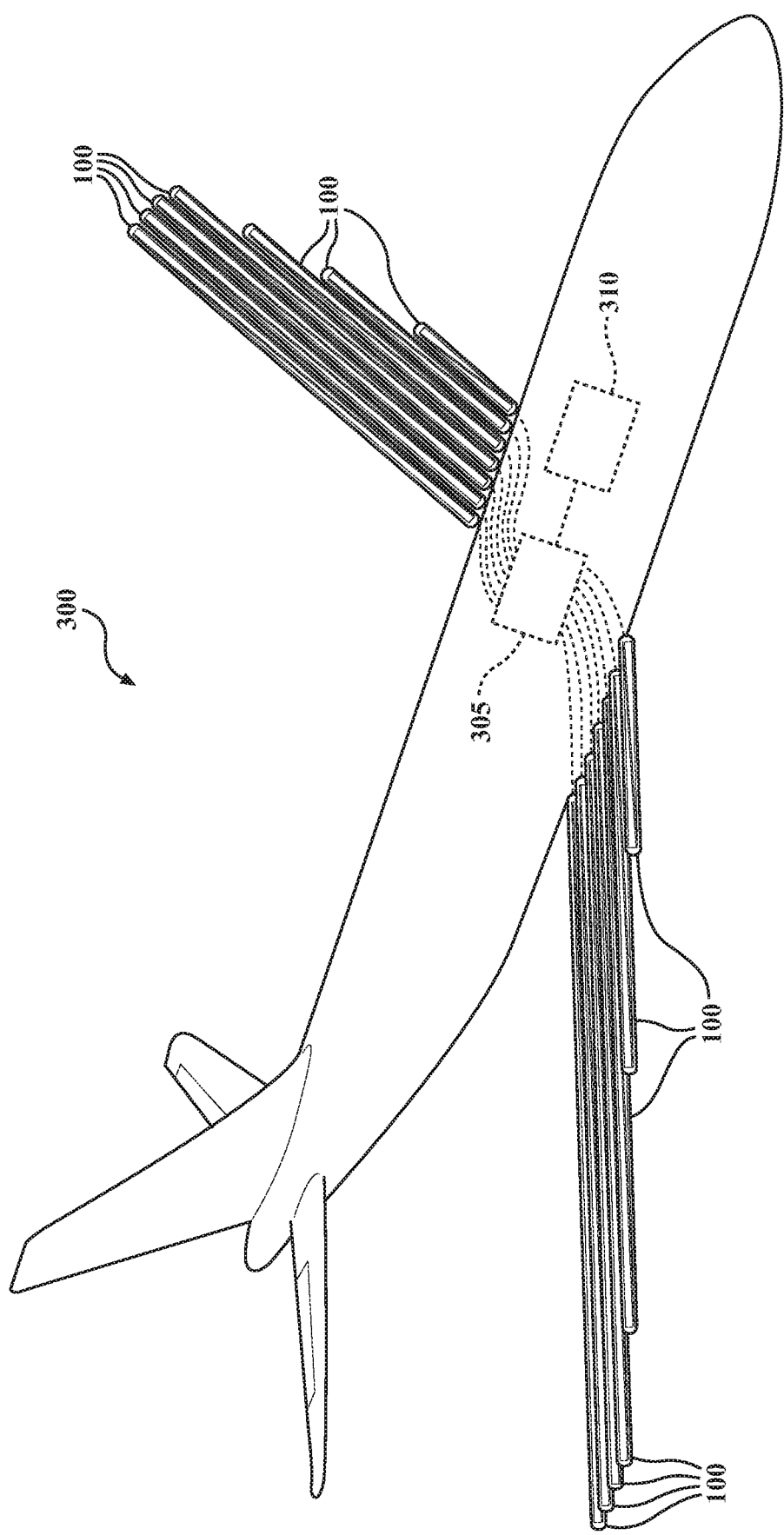
FIG. 6 is a perspective view illustrating an example implementation of the detection system for detecting kinking in inflatable members of an aircraft wing.

As an example of how the detection system 300 may be used to detect the formation of a kink, FIG. 6 will now be discussed. FIG. 6 illustrates an aircraft with inflatable wings. For example, the wings are constructed of inflatable tubes (also known as inflatable beams) that serve as the bendable structures 100 of the detection system 300. The bendable structures 100 include the first and second sensors 105, 110. The control module 310 may be, for example, a standalone module or integrated with the aircraft controllers (not shown). The plurality of first and second sensors 105, 110 may provide a "flex mapping" of the wing and the control module 310 and/or other aircraft controllers may determine how the entire wing is bending, i.e., determining the amounts of bending of the individual bendable structures 100. If the wing becomes kinked in association with one, some or all of the bendable structures 100 becoming kinked, the detection system 300 may determine the location of the kink. For example, the aircraft controllers may utilize the amount of bending and kink information to adjust the movement of the aircraft. As another example, the aircraft controllers may utilize the information from the detection system 300 for kink alleviation. The bendable structures 100 are shown as long inflatable tubes, but may be a plurality of smaller tubes forming a column of discrete bendable structures 100 for each long tube illustrated in FIG. 6.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A detection system, comprising:
    first and second sensors surface-mounted antiparallel along a bendable structure, the bendable structure configured to kink at different locations, and the first and second sensors having bending responses that increase with increasing amounts of bending, and that are increasingly sensitive along their lengths; and
    a control module communicatively connected with the first and second sensors, the control module configured to:
        receive the bending responses at a first time and a second time subsequent to the first time;
        in response to identifying that the bending responses are indicative of unkinked bending at the first time and indicative of kinked bending at the second time, identify the formation of a kink; and
        in response to identifying the formation of the kink, identify the location of the kink based on the bending responses at the first time.

2. The detection system of claim 1, wherein the first and second sensors have widths that increase along their lengths, and a sum of their widths is constant along their lengths.

3. The detection system of claim 1, wherein the control module is configured to identify the location of the kink based on a sum of the bending responses at the first time.

4. The detection system of claim 1, wherein the control module is configured to identify the location of the kink based on a lengthwise overlap of the first and second sensors, and a sum of the bending responses at the first time.

5. The detection system of claim 1, wherein the control module is configured to identify the location of the kink relative to an end of the first sensor based on a lengthwise overlap of the first and second sensors, and dividing the bending response of the first sensor at the first time by a sum of the bending responses at the first time.

6. The detection system of claim 1, wherein the control module is configured to identify an amount of bending at the location of the kink based on a sum of the bending responses at the first time.

7. The detection system of claim 1, wherein the control module is configured to identify an amount of bending at the location of the kink based on a lengthwise overlap of the first and second sensors, and a sum of the bending responses at the first time.

8. The detection system of claim 1, wherein the control module is configured to:
    identify a first amount of bending at the location of the kink based on a sum of the bending responses at the first time;
    receive the bending responses at a third time subsequent to the second time;
    identify a second amount of bending at the location of the kink based on a sum of the bending responses at the third time; and
    based on the first and second amounts of bending at the location of the kink, identify that the kink has been alleviated.

9. The detection system of claim 1, wherein the control module is configured to receive the bending responses at a predetermined sampling rate.

10. A method, comprising:
    receiving, at a first time and a second time subsequent to the first time, bending responses from first and second sensors surface-mounted antiparallel along a bendable structure, the bendable structure configured to kink at different locations, and the first and second sensors having bending responses that increase with increasing amounts of bending, and that are increasingly sensitive along their lengths;
    in response to identifying that the bending responses are indicative of unkinked bending at the first time and indicative of kinked bending at the second time, identifying the formation of a kink; and
    in response to identifying the formation of the kink, identifying the location of the kink based on the bending responses at the first time.

11. The method of claim 10, wherein the first and second sensors have widths that increase along their lengths, and a sum of their widths is constant along their lengths.

12. The method of claim 10, further comprising:
    identifying the location of the kink based on a sum of the bending responses at the first time.

13. The method of claim 10, further comprising:
    identifying the location of the kink based on a lengthwise overlap of the first and second sensors, and a sum of the bending responses at the first time.

14. The method of claim 10, further comprising:
    identifying the location of the kink relative to an end of the first sensor based on a lengthwise overlap of the first and second sensors, and dividing the bending response of the first sensor at the first time by a sum of the bending responses at the first time.

15. The method of claim 10, further comprising:
    identifying an amount of bending at the location of the kink based on a sum of the bending responses at the first time.

16. The method of claim 10, further comprising:
    identifying an amount of bending at the location of the kink based on a lengthwise overlap of the first and second sensors, and a sum of the bending responses at the first time.

17. The method of claim 10, further comprising:
    identifying a first amount of bending at the location of the kink based on a sum of the bending responses at the first time;
    receiving the bending responses at a third time subsequent to the second time;
    identifying a second amount of bending at the location of the kink based on a sum of the bending responses at the third time; and
    based on the first and second amounts of bending at the location of the kink, identifying that the kink has been alleviated.

18. The method of claim 10, further comprising:
    receiving the bending responses at a predetermined sampling rate.

19. A detection system comprising:
    first and second sensors surface-mounted antiparallel along a bendable structure, the bendable structure configured to bend at different locations and, at each location, have different amounts of bending, and the first and second sensors having bending responses that increase with increasing amounts of bending, and that are increasingly sensitive along their lengths; and
    a control module communicatively connected with the first and second sensors, the control module configured to:
        receive the bending responses;
        identify the formation of a bend based on the bending responses; and
        in response to identifying the formation of the bend, identify the location of the bend based on a lengthwise overlap of the first and second sensors, and a sum of the bending responses.

20. The detection system of claim 19, wherein the control module is configured to identify the location of the bend relative to an end of the first sensor based on the lengthwise overlap of the first and second sensors, and dividing the bending response of the first sensor by a sum of the bending responses.

* * * * *